US011250972B1

(12) United States Patent
Evans (10) Patent No.: US 11,250,972 B1
(45) Date of Patent: Feb. 15, 2022

(54) HYBRID CABLES COMPRISING CARBON NANOTUBES UTILIZED TO TRANSMIT POWER

(71) Applicant: Superior Essex International LP, Atlanta, GA (US)

(72) Inventor: Christopher Robert Evans, Kennesaw, GA (US)

(73) Assignee: Superior Essex International LP, Atlanta, GA (US)

( * ) Notice: Subject to any disclaimer, the term of this patent is extended or adjusted under 35 U.S.C. 154(b) by 195 days.

(21) Appl. No.: 16/191,603

(22) Filed: Nov. 15, 2018

(51) Int. Cl.
H01B 9/00 (2006.01)
G02B 6/44 (2006.01)
H01B 1/18 (2006.01)
H01B 1/16 (2006.01)
H01B 9/02 (2006.01)

(52) U.S. Cl.
CPC ........... H01B 9/005 (2013.01); G02B 6/4416 (2013.01); H01B 1/16 (2013.01); H01B 1/18 (2013.01); H01B 9/023 (2013.01)

(58) Field of Classification Search
CPC .......... H01B 9/005; H01B 1/18; H01B 9/023; G02B 6/4416
See application file for complete search history.

(56) References Cited

U.S. PATENT DOCUMENTS

| 3,980,808 | A | * | 9/1976 | Kikuchi | H01B 7/182 |
| | | | | | 174/110 SR |
| 4,280,225 | A | * | 7/1981 | Willis | H01Q 1/002 |
| | | | | | 174/102 SP |
| 5,246,783 | A | * | 9/1993 | Spenadel | H01B 3/441 |
| | | | | | 174/11 OR |
| 6,496,629 | B2 | * | 12/2002 | Ma | G02B 6/4427 |
| | | | | | 385/113 |
| 6,714,707 | B2 | * | 3/2004 | Rossi | G02B 6/4429 |
| | | | | | 385/109 |
| 6,974,239 | B2 | * | 12/2005 | Currie | E01F 15/0453 |
| | | | | | 362/551 |
| 9,188,756 | B2 | * | 11/2015 | Register, III | H05K 9/00 |
| 9,728,302 | B1 | * | 8/2017 | McNutt | G02B 6/441 |
| 2002/0027014 | A1 | * | 3/2002 | Mukoyama | H01B 12/02 |
| | | | | | 174/125.1 |
| 2004/0109652 | A1 | * | 6/2004 | Risch | B01J 20/205 |
| | | | | | 385/102 |
| 2005/0013573 | A1 | * | 1/2005 | Lochkovic | G02B 6/4402 |
| | | | | | 385/128 |
| 2005/0185903 | A1 | * | 8/2005 | Koertel | G02B 6/4439 |
| | | | | | 385/101 |
| 2006/0118322 | A1 | * | 6/2006 | Wiekhorst | H01B 11/12 |
| | | | | | 174/11 OR |
| 2009/0097805 | A1 | * | 4/2009 | Bayindir | G02B 6/02 |
| | | | | | 385/101 |
| 2011/0293218 | A1 | * | 12/2011 | Pettit | B82Y 20/00 |
| | | | | | 385/16 |

(Continued)

*Primary Examiner* — Timothy J Thompson
*Assistant Examiner* — Rhadames Alonzo Miller (57) ABSTRACT

A hybrid cable may include a central strength member and a plurality of buffer tubes helically wrapped around the central member. Each of the plurality of buffer tubes may house at least one optical fiber, and an outer jacket may surround the plurality of buffer tubes and the central strength member. Additionally, the central strength member may include one or more carbon nanotubes capable of transmitting a power signal.

16 Claims, 3 Drawing Sheets

(56) References Cited

U.S. PATENT DOCUMENTS

| | | | | |
|---|---|---|---|---|
| 2013/0257262 | A1* | 10/2013 | Liu | H01J 9/025 |
| | | | | 313/309 |
| 2013/0260634 | A1* | 10/2013 | Liu | H01J 9/025 |
| | | | | 445/51 |
| 2014/0231118 | A1* | 8/2014 | Koziol | H01B 3/46 |
| | | | | 174/11 OR |
| 2014/0269972 | A1* | 9/2014 | Rada | H04B 1/3838 |
| | | | | 375/285 |
| 2016/0133355 | A1* | 5/2016 | Glew | H01B 3/30 |
| | | | | 248/49 |
| 2016/0147028 | A1* | 5/2016 | Kumar | G02B 6/02395 |
| | | | | 385/103 |
| 2016/0148725 | A1* | 5/2016 | Flory | H01B 3/47 |
| | | | | 174/107 |
| 2016/0353617 | A1* | 12/2016 | Gimblet | H05K 9/0086 |
| 2016/0356974 | A1* | 12/2016 | Bringuier | B23K 26/21 |
| 2017/0154710 | A1* | 6/2017 | Cobb, Jr. | H01B 11/002 |
| 2017/0276891 | A1* | 9/2017 | Esseghir | H01B 13/14 |
| 2018/0247733 | A1* | 8/2018 | Mann | H01B 7/0869 |
| 2018/0268961 | A1* | 9/2018 | Kim | H01B 7/14 |
| 2018/0322985 | A1* | 11/2018 | Glew | H01B 1/22 |
| 2018/0364433 | A1* | 12/2018 | Leach | H01B 9/005 |
| 2020/0110218 | A1* | 4/2020 | Hendrickson | C03C 25/109 |

* cited by examiner

HYBRID CABLES COMPRISING CARBON NANOTUBES UTILIZED TO TRANSMIT POWER

TECHNICAL FIELD

Embodiments of the disclosure relate generally to hybrid cables that include both optical fiber and electrically conductive transmission media and, more particularly, to hybrid cables that include carbon nanotubes as electrically conductive transmission media.

BACKGROUND

Hybrid cables are utilized in a wide variety of applications that require the transmission of both power and communication signals. Hybrid cables typically include optical fiber components that are utilized to transmit communications signals and metallic conductors that are utilized to transmit power signals. However, metallic conductors are relatively heavy, thereby leading to an increase in the weight of the cable. For certain applications, such as aerial applications in which a cable may be required to support its own weight or load, the weight of metallic conductors may necessitate the incorporation of additional strength members into a cable. Accordingly, there is an opportunity for improved hybrid cables that incorporate carbon nanotubes as conductive elements for transmitting power signals. There is also an opportunity for improved hybrid cables having lower weight and/or higher power transmission efficiency than traditional hybrid cables.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items; however, various embodiments may utilize elements and/or components other than those illustrated in the figures. Additionally, the drawings are provided to illustrate example embodiments described herein and are not intended to limit the scope of the disclosure.

DETAILED DESCRIPTION

Various embodiments of the present disclosure are directed to hybrid cables that incorporate carbon nanotubes as conductive elements suitable for transmitting power signals. In certain embodiments, a hybrid cable may include a central strength member ("CSM"), and a plurality of buffer tubes may be stranded or otherwise positioned around the CSM. Each buffer tube may be configured to house one or more optical fibers (e.g., loose fibers, optical fiber ribbons, etc.) and/or other suitable transmission media. An outer jacket may be formed around the CSM and the buffer tubes.

According to an aspect of the disclosure, the CSM may include or incorporate one or more carbon nanotubes that are suitable for the transmission of electrical power signals. For example, the CSM may include one or more carbon nanotubes that are capable of transmitting a power signal of at least 12 volts. A wide variety of carbon nanotube ("CNT") constructions may be incorporated into a CSM as desired in various embodiments. In one example embodiment, a plurality of CNTs may be bonded together with an epoxy resin in order to form a conductive element. In another example embodiment, a plurality of CNTs may be helically twisted or otherwise stranded together. In other example embodiments, one or more CNTs may be stranded with one or more metallic conductors and/or one or more dielectric strength members (e.g., strength yarns, strength rods, etc.). In another example embodiment, one or more CNTs may be stranded around a dielectric strength member (e.g., a glass reinforced plastic rod, etc.) or a metallic conductor. In yet another example embodiments, one or more CNTs may be positioned within a longitudinally extending hollow cavity or channel of a dielectric strength member. Other CNT constructions may be utilized as desired in conjunction with a CSM.

Additionally, in certain embodiments, a CSM may be constructed to include a single conductive path. For example, one or more CNTs or a combination of one or more CNTs and one or more metallic conductors may be in electrical contact with one another. In other embodiments, a CSM may be constructed to include a plurality of conductive paths. For example, a CSM may be formed with a plurality of individually insulated components, and each of the individually insulated components may be capable of transmitting a desired power signal. At least one of the plurality of individually insulated components may include at least one CNT. Additionally, an individually insulated component that includes one or more CNTs may be formed with a wide variety of suitable constructions, such as any of the constructions discussed above (e.g., CNTs bonded together with an epoxy resin, stranded CNTs, etc.).

As a result of incorporating one or more CNTs into a CSM, a hybrid cable may be formed with a reduced weight relative to conventional hybrid cables. Conventional hybrid cables typically utilize metallic conductors to transmit power signals. CNTs may be formed with a reduced weight relative to metallic conductors, thereby reducing the overall weight of a hybrid cable. In certain applications, such as aerial applications in which a hybrid cable may be required to support its own weight or load, the reduced weight of the conductive elements may enhance the performance of the hybrid cable, allow the hybrid cable to be formed with fewer strength elements (e.g., strength yarns, etc.), and/or allow the hybrid cable to be formed with a smaller overall diameter or size (e.g., as a result of incorporating fewer strength elements, etc.). Additionally, in certain embodiments, CNTs may be more electrically efficient than metallic conductors, thereby enhancing the power transmission properties of a hybrid cable relative to conventional cables.

Certain example embodiments of the disclosure now will be described more fully hereinafter with reference to the accompanying drawings, in which certain embodiments of the disclosure are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
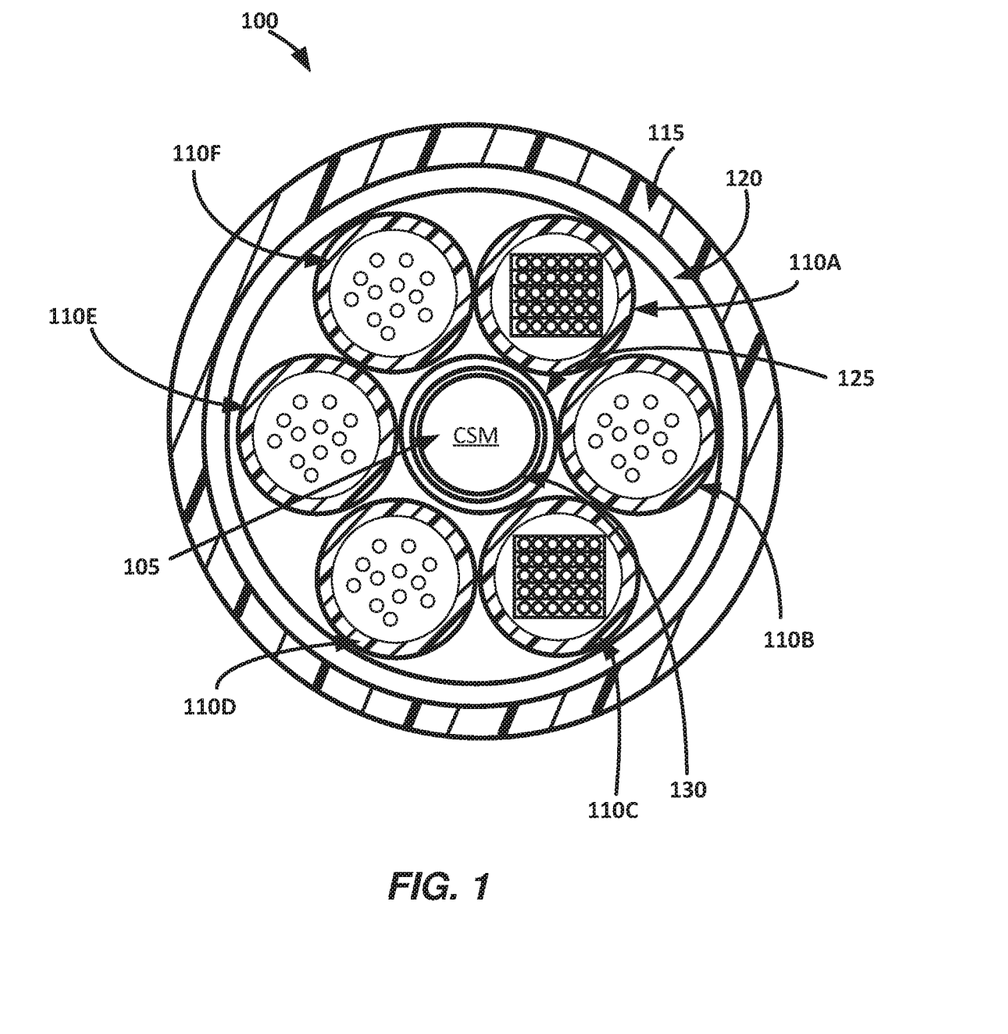
FIG. 1 is a cross-sectional view of an example hybrid cable, according to an illustrative embodiment of the disclosure.

FIG. 1 depicts a cross-sectional view of an example hybrid cable 100, according to an illustrative embodiment of the disclosure. The hybrid cable 100 may be suitable for use in a wide variety of applications that require both the transmission of communications signals and power signals. For example, the hybrid cable 100 may be utilized in indoor, plenum, riser, outdoor, aerial, vertical, buried, and/or other suitable applications. The illustrated hybrid cable 100 may include a longitudinally extending central strength member ("CSM") 105, a plurality of longitudinally extending buffer tubes 110A-N positioned around the CSM 105, and a jacket 115 formed around the plurality of buffer tubes 110A-F and the CSM 105. In certain embodiments, one or more outer wraps 120 may be positioned between the buffer tubes 110A-N and the jacket 115. Each of these components is described in greater detail below.

The CSM 105 may provide strength and structural support for the hybrid cable 100 and the various components of the hybrid cable 100. For example, the CSM 105 may provide desired tensile and/or compressive strength that supports the axial load of hybrid cable 100 and assists in preventing or limiting attenuation within the optical fibers. In certain embodiments, the CSM 105 may also assist the hybrid cable 100 in resisting thermal expansion and contraction. Additionally, the CSM 105 may include one or more components that are capable of transmitting an electrical power signal. According to an aspect of the disclosure, the CSM 105 may include one or more CNT structures that are suitable for transmitting an electrical power signal. In certain embodiments, the CNT structures may be the only components of the CSM 105 capable of transmitting power. In other embodiments, one or more CNT structures may be combined with one or more other components capable of transmitting power, such as one or more metallic conductors.

A wide variety of suitable carbon nanotube ("CNT") constructions may be incorporated into the CSM 105 as desired in various embodiments. A few non-limiting examples of CSM constructions that incorporate CNTs are described in greater detail below with reference to FIGS. 2A-2J. Any of these example constructions, as well as any suitable combinations of features described in these example constructions, may be utilized for the CSM 105 illustrated in FIG. 1.

Figure 2A:
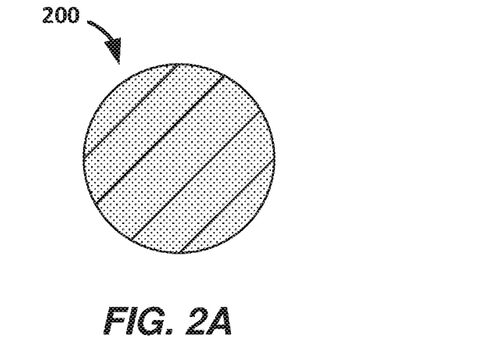
FIGS. 2A-2J are cross-sectional views of example central strength members that include carbon nanotubes, according to illustrative embodiments of the disclosure.

Turning first to FIG. 2A, a first example CSM construction 200 is illustrated. The CSM construction 200 may include a longitudinally extending CNT component formed from a plurality of CNTs that have been bonded, adhered, or otherwise joined together. For example, a plurality of CNTs may be bonded or adhered together with an epoxy resin. The plurality of joined CNTs may form a unitary structure that is capable of transmitting a power signal along a longitudinal length of a CSM 105 and/or a hybrid cable 100. Any number of CNTs may be utilized as desired in various embodiment. Additionally, each of the individual CNTs may have any suitable dimensions (e.g., cross-sectional shape, cross-sectional area, longitudinal length, etc.) as desired in various embodiments. A wide variety of different types of CNTs may also be utilized as desired including, but not limited to, single-walled CNTs and/or multi-walled CNTs. The overall CNT component may also be formed with any suitable dimensions, such as any suitable cross-sectional shape (e.g., a circular cross-sectional shape, etc.), cross-sectional area, diameter, etc.

A wide variety of suitable epoxy resins, low molecular weight pre-polymers, polymers containing epoxide groups, and/or other suitable materials may be utilized as desired to bond or join a plurality of CNTs together in order to form the CNT component. Examples of suitable epoxy resins include, but are not limited to, bisphenol A epoxy resin, bisphenol F epoxy resin, novolac epoxy resin, cycloaliphatic epoxy resin, and/or glycidylamine epoxy resin. Additionally, when combined with the CNTs, the epoxy resin may formed any desirable percentage of the CNT component. For example, the epoxy resin may formed approximately 1.0% by weight of the CNT component. In other embodiments, the epoxy resin may form approximately 0.25, 0.5, 0.75, 1.0, 1.25, 1.5, 1.75, 2.0, 2.5, 3.0, 3.5, 4.0, 4.5, or 5.0 percent by weight of the CNT component, a percentage included in a range between any two of the above values, or a percentage included in a range bounded on either a minimum or maximum end by one of the above values.

As an alternative to bonding a plurality of CNTs together with an epoxy resin or other suitable adhesive, in other embodiments, CNTs may be bonded together by a wide variety of other suitable method and/or techniques. For example, a plurality of CNTs may be bonded or joined together via arc discharge bonding, chemical bonding, hydrogen bonding, and/or any other suitable techniques and/or combination of techniques. Additionally, as an alternative to bonding a plurality of CNTs together to form a CNT component, in other embodiments, a single or unitary CNT structure may be formed for incorporation into a CSM 105.

Figure 2B:
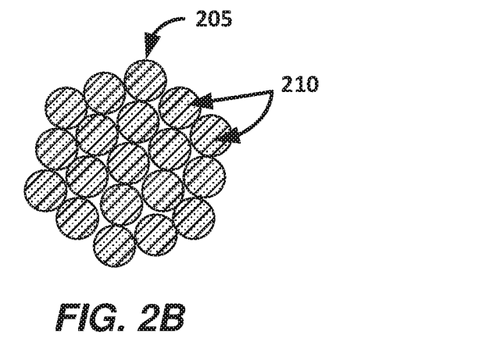

FIG. 2B illustrates another example CSM construction 205 that includes a plurality of longitudinally extending CNT components 210 that are stranded together. For example, the plurality of CNT components 210 may be helically twisted or S-Z stranded together. Any suitable number of CNT components 210 may be stranded together as desired in various embodiments. For example, 2, 3, 5, 7, 10, 12, 15, 20, 25, or 30 CNT components 210, a number of CNT components 210 included in a range between any two of the above values, or a number of CNT components 210 included in a range bounded on a minimum end by one of the above values may be stranded together. Each CNT component (generally referred to as CNT component 210) may be formed in accordance with a wide variety of suitable methods or techniques. For example, in certain embodiments, each CNT component 210 or strand may be formed as a single or unitary CNT structure. In other embodiments, each CNT component 210 may be formed by bonding, adhering, or otherwise joining a plurality of CNTs together.

Additionally, each CNT component 210 may be formed with any suitable dimensions, such as any suitable cross-sectional shape, cross-sectional area, and/or diameter. In certain embodiments, a CNT component 210 may have a diameter between approximately 0.005 mm and approximately 0.25 mm. In various embodiments, a CNT component 210 may have a diameter of approximately 0.005, 0.01, 0.02, 0.025, 0.04, 0.05, 0.07, 0.08, 0.10, 0.15, 0.20, or 0.25 mm, a diameter included in a range between any two of the above values, or a diameter included in a range bounded on either a minimum or maximum end by one of the above values. Additionally, in certain embodiments, each of the CNT components 210 may have approximately equal or similar dimensions. In other embodiment, at least two of the CNT components 210 may have one or more different dimensions, such as different diameters, etc.

Figure 2C:
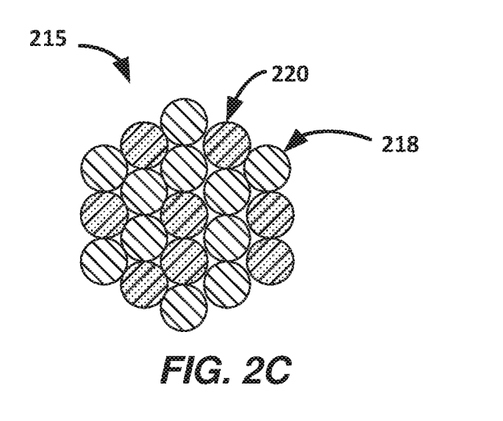

With reference to FIG. 2C, another example, CSM construction 215 is illustrated. The example CSM construction 215 may include one or more CNT components 218 and one or more other conductive components 220 that are stranded together. For example, the CNT component(s) 218 and the other conductive component(s) 220 may be helically twisted or S-Z stranded together. Any suitable number of CNT components 218 may be incorporated into the CSM construction 215 as desired in various embodiments. For example, 2, 3, 5, 7, 10, 12, 15, 20, 25, or 30 CNT components 218, a number of CNT components 218 included in a range between any two of the above values, or a number of CNT components 210 included in a range bounded on a minimum end by one of the above values may be incorporated into the CSM construction 215. Each CNT component (generally referred to as CNT component 218) may be formed in accordance with a wide variety of suitable methods or techniques. For example, in certain embodiments, each CNT component 218 may be formed as a single or unitary CNT structure. In other embodiments, each CNT component 218 may be formed by bonding, adhering, or otherwise joining a plurality of CNTs together. Additionally, each CNT component 218 may be formed with any suitable dimensions, such as any suitable cross-sectional shape, cross-sectional area, and/or diameter, such as any of the dimensions discussed above with reference to FIG. 2B. In the event that a plurality of CNT components 218 are utilized, in certain embodiments, each of the CNT components 218 may have approximately equal or similar dimensions. In other embodiment, at least two of the CNT components 218 may have one or more different dimensions, such as different diameters, etc.

Additionally, any suitable number of other conductive components 220 may be incorporated into the CSM construction 215 as desired in various embodiments. For example, 2, 3, 5, 7, 10, 12, 15, 20, 25, or 30 conductive components 220, a number of components 220 included in a range between any two of the above values, or a number of components 220 included in a range bounded on a minimum end by one of the above values may be incorporated into the CSM construction 215. In certain embodiments, a number of conductive components 220 utilized, as well as the dimensions, of any number of the conductive components 220 may be selected or based at least in part upon a desired strength or structural support to be provided to the CNTs and/or a CSM 105 by the conductive components 220 and/or desired electrical transmission characteristics of the CSM 105. In other words, the construction of a CSM 105 may be specifically engineered to combine CNTs with other conductive components in order to satisfy desired structural support and/or electrical transmission requirements.

Each conductive component (generally referred to as conductive component 220) may be formed from a wide variety of suitable conductive materials and/or combination of materials. For example, each conductive component 220 may be formed from copper, aluminum, silver, annealed copper, gold, any suitable metallic material a conductive alloy, conductive composite materials, etc. Indeed, a conductive component 220 may be formed from any suitable electrically conductive material(s) having an electrical resistivity of less than approximately $1 \times 10^{-7}$ ohm meters at approximately 20° C., such as an electrical resistivity of less than approximately $3 \times 10^{-8}$ ohm meters at approximately 20° C.

In certain embodiments, a conductive component 220 may be formed as a solid component. In other embodiments, a conductive component 220 may be formed from a plurality of strands that are twisted together. Additionally, each conductive component 220 may be formed with any suitable dimensions, such as any suitable cross-sectional shape, cross-sectional area, and/or diameter, such as any of the dimensions discussed above with reference to the CNT components 210 of FIG. 2B. In the event that a plurality of conductive components 220 are utilized, in certain embodiments, each of the conductive components 220 may have approximately equal or similar dimensions. In other embodiments, at least two of the conductive components 220 may have one or more different dimensions, such as different diameters, etc. Further, in certain embodiments, the one or more CNT components 218 and the one or more conductive components 220 may have approximately equal or similar dimensions. In other embodiments, at least two components 218, 220 may have one or more different dimensions.

Figure 2D:
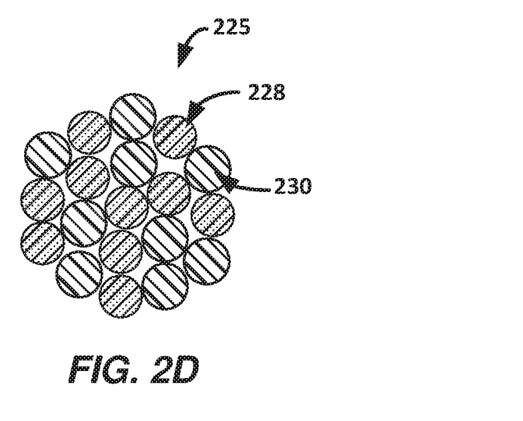

FIG. 2D illustrates another example CSM construction 225 that includes one or more CNT components 228 and one or more dielectric components 230 that are stranded together. For example, the CNT component(s) 228 and the dielectric component(s) 230 may be helically twisted or S-Z stranded together. As discussed above with reference to FIG. 2C, any suitable number of CNT components 228 may be incorporated into the CSM construction 225, and each CNT component (generally referred to as CNT component 228) may be formed in accordance with a wide variety of suitable methods or techniques. Additionally, each CNT component 228 may be formed with any suitable dimensions.

Any suitable number of dielectric components 230 may be incorporated into the CSM construction 225 as desired in various embodiments. For example, 2, 3, 5, 7, 10, 12, 15, 20, 25, or 30 dielectric components 230, a number of components 230 included in a range between any two of the above values, or a number of components 230 included in a range bounded on a minimum end by one of the above values may be incorporated into the CSM construction 235. In certain embodiments, a number of dielectric components 230 utilized, as well as the dimensions, of any number of the dielectric components 230 may be selected or based at least in part upon a desired strength or structural support to be provided to the CNTs and/or a CSM 105 by the dielectric components 230.

The dielectric component(s) 230 may be formed from a wide variety of suitable materials and/or combinations of materials. In certain embodiments, the dielectric component(s) 230 may include one or more strength yarns or relatively flexible strength members including, but not limited to aramid yarns or aramid fibers (e.g., meta-aramid yarns, para-aramid yarns, etc.), Spectra® fiber manufactured and sold by Honeywell International Inc., Technora® fiber manufactured and sold by Teijin Aramid BV, basalt fiber, ultra-high-molecular weight polyethylene ("UHMWPE"), fiberglass yarns, etc. In other embodiments, the dielectric component(s) 230 may alternatively or additionally include one or more relatively rigid strength members including, but not limited to, glass reinforced plastic ("GRP"), fiber reinforced plastic ("FRP"), fiberglass, and/or fiberglass/epoxy composite strength members.

Additionally, each dielectric component 230 may be formed with any suitable dimensions, such as any suitable cross-sectional shape, cross-sectional area, and/or diameter, such as any of the dimensions discussed above with reference to the CNT components 210 of FIG. 2B. In the event that a plurality of dielectric components 230 are utilized, in certain embodiments, each of the dielectric components 230 may have approximately equal or similar dimensions. In other embodiments, at least two of the dielectric components 230 may have one or more different dimensions, such as different diameters, etc. Further, in certain embodiments, the one or more CNT components 228 and the one or more dielectric components 230 may have approximately equal or similar dimensions. In other embodiments, at least two components 228, 280 may have one or more different dimensions. For example, one or more relatively smaller strength yarns or other strength elements may be positioned within the interstices between a plurality of CNT components 228 and/or around an outer perimeter of the plurality of CNT components 228.

In yet other embodiments, a CSM construction may include one or more CNT components that are stranded with a combination of one or more other conductive components (as illustrated in FIG. 2B) and one or more dielectric components (as illustrated in FIG. 2C). Any suitable number of CNT components, conductive components, and/or dielectric components (e.g., strength yarns, etc.) may be stranded together as desired in various embodiments.

Figure 2E:
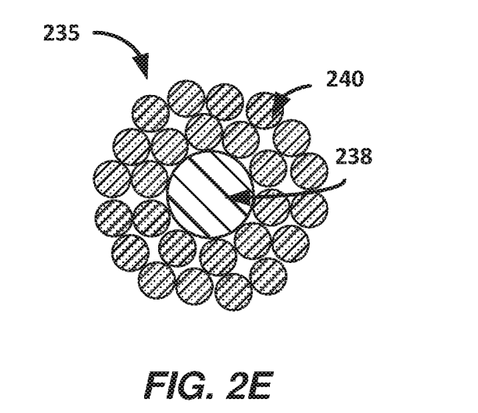

FIG. 2E illustrates another example CSM construction 235 that includes a central strength element 238 and one or more CNT components 240 stranded around the central strength element 238. For example, one or more CNT components 240 may be helically stranded, S-Z stranded, or otherwise stranded around a central strength element. Any number of CNT components 240 may be stranded around a central strength element 238 as desired in various embodiments and discussed above with reference to FIG. 2C. Additionally, each CNT component (generally referred to as CNT component 240) may be formed in accordance with a wide variety of suitable methods or techniques and/or with any suitable dimensions.

In certain embodiments, the central strength element 238 may be formed as a dielectric strength element. For example, the central strength element 238 may be formed as a relatively rigid dielectric element, such as a glass reinforced plastic ("GRP") rod, a fiber reinforced plastic ("FRP") rod, a fiberglass rod, a fiberglass/epoxy composite rod, etc. As another example, the central strength element 238 may be formed from a plurality of relatively flexible strength elements, such as a plurality of helically twisted strength yarns. As yet another example, the central strength element 238 may be formed from a combination of rigid and flexible strength elements. In other embodiments, the central strength element 238 may be formed as a conductive component, such as metallic conductor, a plurality of stranded metallic conductors, etc. In yet other embodiments, the central strength element 238 may be formed from a combination of dielectric and conductive components.

Regardless of the construction utilized to form the central strength element 238, the central strength element 238 may be formed with any suitable dimensions as desired in various embodiments. For example, the central strength element 238 may be formed with any suitable diameter, cross-sectional area, and/or other dimensions. In certain embodiments, the central strength element 238 may be formed with a diameter of approximately 1.0, 1.25, 1.5, 1.75, 2.0, 2.25, 2.5, 2.75, 3.0, 3.25, 3.5, 3.75, 4.0, 4.25, or 4.5 mm, a diameter included in a range between any two of the above values, or a diameter included in a range bounded on either a minimum or maximum end by one of the above values.

As an alternative to stranding one or more CNTs 240 around a central strength element (e.g., a strength rod, a central conductive component, etc.) 238, in other embodiments, a plurality of components that include at least one CNT and at least one other component may be stranded around a central strength element 238. As desired, the other component(s) may include one or more conductive components (as discussed above with reference to FIG. 2B) and one or more dielectric components (as discussed above with reference to FIG. 2C).

Figure 2F:
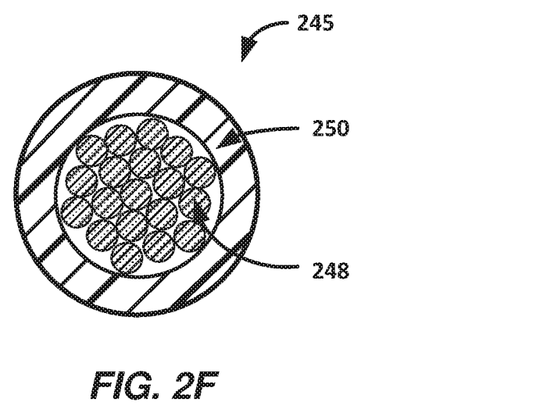

FIG. 2F illustrates another example CSM construction 245 in which one or more CNT components 248 are positioned within an outer strength element 250. For example, one or more CNT components 248 may be positioned within one or more longitudinally extending channels or cavities formed by or within an outer strength element 250. As shown in FIG. 2F, in certain embodiments, the outer strength element 250 may be formed a tubular structure around the CNT component(s) 248 or, alternatively, the CNT component(s) 248 may be positioned within the outer strength element 250. Any number of CNT components 248 may be positioned within the outer strength element 248 as desired in various embodiments and discussed above with reference to FIG. 2C. Additionally, each CNT component (generally referred to as CNT component 248) may be formed in accordance with a wide variety of suitable methods or techniques and/or with any suitable dimensions.

In certain embodiments, the outer strength element 250 may be formed as a dielectric strength element. For example, the outer strength element 250 may be formed as a relatively rigid dielectric element, such as a glass reinforced plastic ("GRP") component, a fiber reinforced plastic ("FRP") component, a fiberglass component, a fiberglass/epoxy composite component, etc. As desired, a rigid dielectric element may be formed around the CNT component(s) 248. For example, glass yarns may be positioned adjacent to the CNT component(s) 248, and a suitable resin may be combined with the glass yarns in order to form a GRP outer strength element 250. As another example, the outer strength element 250 may be formed from a plurality of relatively flexible strength elements, such as a plurality of strength yarns that are stranded (e.g., helically twisted, S-Z stranded, etc.) around the CNT component(s) 248. As yet another example, the outer strength element 250 may be formed from a combination of rigid and flexible strength elements. In other embodiments, the central strength element 250 may be formed as a conductive component. For example, a plurality of metallic conductors may be positioned around (e.g., longitudinally extending parallel conductors, etc.) or stranded (e.g., helically twisted, S-Z stranded, etc.) around the CNT component(s) 248. As another example, a metallic braid may be formed around the CNT component(s) 248. As yet another example, a metallic wrap or shield may be formed around the CNT component(s) 248. In yet other embodiments, the outer strength element 250 may be formed from a combination of dielectric and conductive components.

Regardless of the construction utilized to form the outer strength element 250, the outer strength element 250 may be formed with any suitable dimensions as desired in various embodiments. For example, the outer strength element 250 may be formed with any suitable thickness, inner and/or outer diameter, and/or other dimensions. In certain embodiments, the outer strength element 250 may be formed with a thickness of approximately 0.5, 0.75, 1.0, 1.25, 1.5, 1.75, 2.0, 2.25, 2.5, 3.0, 3.25, 3.5, 4.0, 4.25, or 4.5 mm, a thickness included in a range between any two of the above values (e.g., a thickness between approximately 0.5 mm and approximately 2.5 mm, etc.), or a thickness included in a range bounded on either a minimum or maximum end by one of the above values.

As an alternative to positioning one or more CNTs 248 within an outer strength element 250, in other embodiments, a plurality of components that include at least one CNT and at least one other component may be positioned within an outer strength element 250. As desired, the other component(s) may include one or more conductive components (as discussed above with reference to FIG. 2B) and one or more dielectric components (as discussed above with reference to FIG. 2C).

Figure 2G:
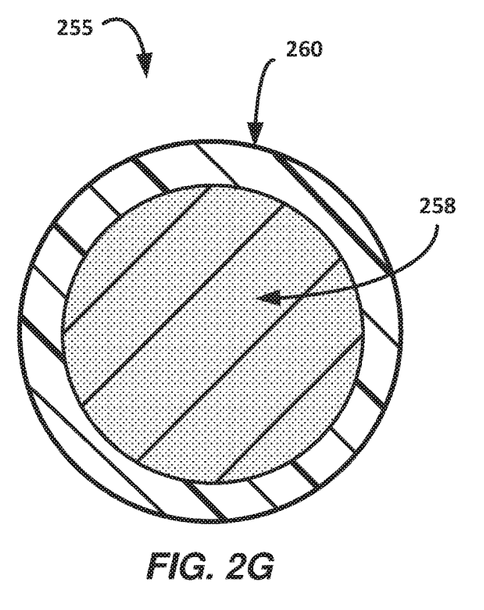
Figure 2H:
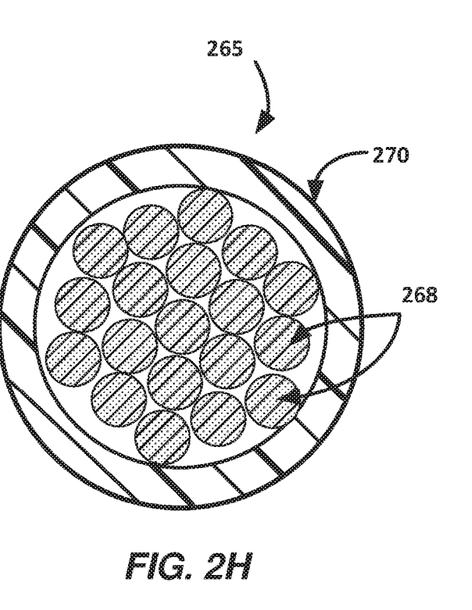

In certain embodiments, a CSM 105 may be formed to include one or more outer wraps, such as one or more binder threads and/or a jacket layer. FIG. 2G illustrates an example CSM construction 255 in which a CNT component 258 is encapsulated within an outer wrap 260. The CNT component 258 may be similar to the CNT component illustrated and described in greater detail above with reference to FIG. 2A. FIG. 2H illustrates another example CSM construction 265 in which a plurality of stranded components 268 are positioned within an outer wrap 270. As shown, in certain embodiments, the plurality of stranded components 268 may include a plurality of stranded CNT components. These stranded CNT components may be similar to the CNT components 210 discussed above with reference to FIG. 2B. In other embodiments, as described in greater detail above with reference to FIGS. 2C and 2D, one or more CNT components may be stranded with one or more other conductive components (e.g., metallic conductors, etc.) and/or with one or more dielectric components (e.g., strength rods, strength yarns, etc.). In yet other embodiments, as described above with reference to FIG. 2E, any number of components (e.g., CNT components, dielectric components, etc.) may be stranded around a central element (e.g., a central strength rod, a central conductive component, etc.), and one or more outer wraps may be formed around the stranded components. Similarly, in other embodiments, as described above with reference to FIG. 2F, one or more stranded or unstranded components may be positioned within an outer strength element having one or more cavities, and an outer wrap may be formed around the outer strength element. Indeed, one or more outer wraps may be incorporated into a wide variety of different CSM constructions as desired.

Regardless of the applicable CSM construction, an outer wrap (generally referred to as outer wrap 260) may assist in maintaining the positions of the internal components of a CSM and/or holding the internal CSM components together. In certain embodiments, the outer wrap 260 may also assist in limiting the migration of various internal components of a CSM construction, such as any internal strength yarns, a filling compound, etc.

In certain embodiments, an outer wrap 260 may be formed as a jacket layer, such as an extruded jacket layer. As such, the outer wrap 260 may be formed from a wide variety of suitable materials, such as a polymeric material, polyvinyl chloride ("PVC"), polyurethane, one or more polymers, a fluoropolymer, polyethylene, medium density polyethylene ("MDPE"), neoprene, chlorosulfonated polyethylene, polyvinylidene fluoride ("PVDF"), polypropylene, modified ethylene-chlorotrifluoroethylene, fluorinated ethylene propylene ("FEP"), ultraviolet resistant PVC, flame retardant PVC, low temperature oil resistant PVC, polyolefin, flame retardant polyurethane, flexible PVC, low smoke zero halogen ("LSZH") material, plastic, rubber, acrylic, or some other appropriate material known in the art, or a combination of suitable materials. As desired, the outer wrap 260 may optionally include flame retardant materials, smoke suppressant materials, and/or other suitable additives. Additionally, the outer wrap 260 may include a single layer or, alternatively, multiple layers of material (i.e., multiple layers of the same material, multiple layers of different materials, etc.).

In other embodiments, the outer wrap 260 may be formed as one or more binder threads that may be helically or contra helically wrapped around a plurality of internal CSM components. In yet other embodiments, the outer wrap 260 may be a single or multi-layer wrap that is longitudinally curled around one or more internal CSM components. For example, the outer wrap 260 may be formed as a suitable single or multi-layer tape. As desired, a tape may be bonded, adhered, ultrasonic welded, or otherwise affixed to itself (e.g., affixed with mechanical fasteners, etc.) after it is wrapped or curled around the internal CSM component(s). In other embodiments, a tape may be helically twisted around the internal CSM component(s). As desired, adjacent helical wrappings may overlap one another along a longitudinal length such that the internal CSM component(s) are enclosed.

An outer wrap 260 that is formed as a tape may include a wide variety of suitable materials and/or combinations of materials. For example, a tape may include one or more polymeric materials, one or more polyolefins (e.g., polyethylene, polypropylene, etc.), one or more fluoropolymers (e.g., fluorinated ethylene propylene ("FEP"), one or more polyesters, polyethylene-terephthalate, mylar, or a combination of any of the above materials). Additionally, a tape may include any number of suitable layers. As desired, water blocking, flame retardant, and/or other layers and/or materials may be incorporated into a tape.

Additionally, an outer wrap 260 may be formed with a wide variety of suitable dimensions as desired in various embodiments. For example, an outer wrap 260 may be formed with any suitable thickness, inner diameter, outer diameter, and/or width (e.g., for tapes, etc.). In certain embodiments, a width may be selected such that a tape wrap may be longitudinally curled around the internal CSM component(s) in order to enclose or surround the internal CSM component(s).

Regardless of the construction utilized to form an outer wrap 260, in certain embodiments, the outer wrap 260 may be formed from all dielectric materials. In other embodiments, the outer wrap 260 may incorporate shielding material, such as electrically conductive shielding material. For example, the outer wrap 260 may include a layer of electrically conductive material formed on a dielectric layer or between two dielectric layers. In other embodiments, the outer wrap 260 may include water blocking materials. Indeed, the outer wrap 260 may include any suitable number of layers, and each layer may be formed from a wide variety of suitable materials.

In certain CSM constructions, such as CSM constructions that include an outer wrap or CSM constructions that utilize an outer strength element, a CSM may be formed as either a "dry" or "filled" CSM. For example, in certain embodiments, a filling compound may be utilized to fill a CSM. In other words, a filling compound may be utilized to fill the interstitial spaces within the CSM that are not occupied by other internal components. A wide variety of filling compounds may be utilized as desired. For example, water-blocking gels, grease, foam materials, etc. may be utilized as desired. In other embodiments, a CSM may be formed as a "dry" CSM that does not include filling compound. As desired, water-blocking tapes, water-blocking wraps, water-blocking yarns, water-blocking powders, moisture absorbing materials, dry inserts, and/or a wide variety of other suitable materials may be incorporated into a CSM construction.

Additionally, in certain embodiments, a CSM 105 may be constructed to include a single conductive path. For example, one or more CNTs or a combination of one or more CNTs and one or more metallic conductors may be in electrical contact with one another. In other embodiments, a CSM 105 may be constructed to include a plurality of conductive paths. For example, a CSM 105 may be formed with a plurality of individually insulated components, and each of the individually insulated components may be capable of transmitting a desired power signal. According to an aspect of the disclosure, at least one of the plurality of individually insulated components may include at least one CNT. Additionally, an individually insulated component that includes one or more CNTs may be formed with a wide variety of suitable constructions, such as any of the constructions discussed above with reference to FIGS. 2A-2H (e.g., CNTs bonded together with an epoxy resin, stranded CNTs, etc.).

Figure 2I:
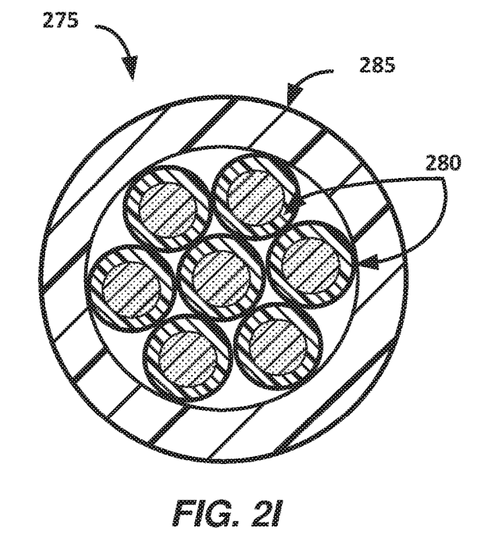

FIG. 2I illustrates one example CSM construction 275 that includes a plurality of individually insulated components 280. As illustrated, each of the individually insulated components 280 may include CNTs. In other embodiments, a first subset of the individually insulated components may include CNTs while a second subset of individually insulated components may include other conductive elements. Further, in certain embodiments, the individually insulated components 280 may extend parallel to one another along a longitudinal direction. In other embodiments, the plurality of individually insulated components 280 may be helically twisted, S-Z stranded, or otherwise stranded together. As desired, one or more dielectric components may be combined with the individually insulated components 280. Additionally, one or more outer wraps 285 (e.g., a jacket layer, one or more binders, etc.) may optionally be formed around the plurality of individually insulated components 280.

Figure 2J:
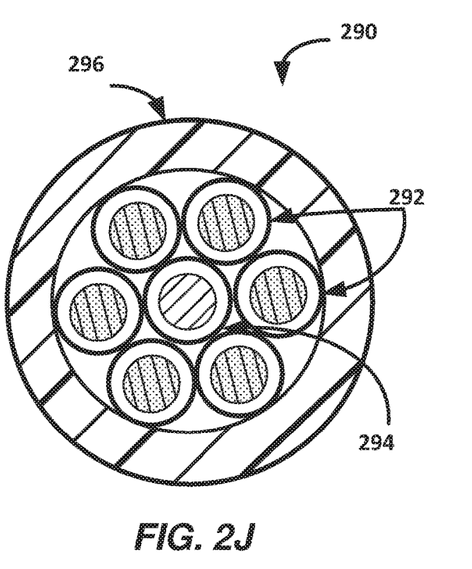

FIG. 2J illustrates another example CSM construction 290 that includes a plurality of individually insulated components 292. However, in contrast to the CSM construction 275 of FIG. 2I, the plurality of individually insulated components 292 of FIG. 2J may be stranded or otherwise positioned around a central strength element 294. Each of the individually insulated components 292 may be formed with a wide variety of suitable constructions. For example, as illustrated in FIG. 2J, each of the individually insulated components 292 may include CNTs. In other embodiments, a first subset of individually insulated components may include CNTs while a second subset of individually insulated components include other conductors. Additionally, one or more dielectric components may optionally be combined with the individually insulated components 292.

The central strength element 294 may also be formed with a wide variety of suitable constructions. In certain embodiments, as shown in FIG. 2J, the central strength element 294 may be formed as an individually insulated conductive component (e.g., a metallic conductor, etc.). In other embodiments, the central strength element 294 may be formed as an uninsulated conductive component, and the individually insulated components 292 may provide isolation between the central strength element 294 and other components of a CSM. In yet other embodiments, the central strength element 294 may be formed as a dielectric component, such as a dielectric strength rod (e.g., a GRP rod). Additionally, one or more outer wraps 296 (e.g., a jacket layer, one or more binders, etc.) may optionally be formed around the plurality of individually insulated components 292.

Regardless of the construction of a CSM, any suitable number of individually insulated components may be utilized as desired. For example, 2, 3, 4, 5, 6, 8, or 10 individually insulated components may be utilized, a number of individually insulated components may be included in a range between any two of the above values, or a number of individually insulated components may be included in a range bounded on either a minimum or maximum end by one of the above values. Each individually insulated component may also be sized to be capable of transmitting any desired power signal. Further, in certain embodiments, a single individually insulated component may be utilized to transmit a desired power signal. In other embodiments, a plurality of individually insulated components may be selectively utilized to transmit a desired power signal.

Additionally, the insulation for an individually insulated component may be formed from a wide variety of suitable materials and/or combinations of materials, such as a polymeric material, polyvinyl chloride ("PVC"), polyurethane, one or more polymers, a fluoropolymer, polyethylene, medium density polyethylene ("MDPE"), neoprene, chlorosulfonated polyethylene, polyvinylidene fluoride ("PVDF"), polypropylene, modified ethylene-chlorotrifluoroethylene, fluorinated ethylene propylene ("FEP"), ultraviolet resistant PVC, flame retardant PVC, low temperature oil resistant PVC, polyolefin, flame retardant polyurethane, flexible PVC, low smoke zero halogen ("LSZH") material, plastic, rubber, acrylic, or some other appropriate material known in the art, or a combination of suitable materials. As desired, insulation may optionally include flame retardant materials, smoke suppressant materials, and/or other suitable additives. Additionally, insulation may be formed as a single layer or, alternatively, from multiple layers of material (i.e., multiple layers of the same material, multiple layers of different materials, etc.).

A wide variety of other suitable CNT constructions may be incorporated into a CSM 105 as desired in various embodiments. The constructions discussed above with reference to FIGS. 2A-2J are provided by way of non-limiting example only. Indeed, a CSM 105 may be formed with any suitable number of CNTs and/or with any suitable combination of CNTs and/or other components (e.g., metallic conductors, rigid strength members, flexible strength members, strength yarns, etc.). As such, the CSM 105 may be formed from a wide variety of suitable materials and/or combinations of materials.

Regardless of the construction of the CSM 105, the CSM 105 may be capable of transmitting a wide variety of suitable power signals as desired in various embodiments. For example, in certain embodiments, the CSM 105 may be capable of transmitting a power signal of at least approximately 12 volts. In various embodiments, the CSM 105 may be capable of transmitting a power signal of at least approximately 5, 10, 12, 15, 20, 24, 30, 40, 50, 60, 75, 80, 90, 100, or 120 volts, or a power signal having a voltage included in a range between any two of the above values. In the event that the CSM 105 includes a plurality of individually insulated components (e.g., a plurality of individually insulated CNT components, a combination of one or more individually insulated CNT components and one or more individually insulated metallic conductors, etc.), each of the individually insulated components may be capable of transmitting a wide variety of suitable power signals. As desired, different individually insulated components may be utilized to transmit different power signals. For example, two individually insulated components may be respectively utilized as hot and neutral (or return) conductors.

As desired in certain embodiments, the CSM 105 may also be capable of transmitting one or more data or communications signals. For example, one or more CNT components and/or other conductive components may be utilized to transmit data signals. As another example, one or more optical fibers and/or other transmission media may be incorporated into the CSM 105 and utilized to transmit data signals.

With continued reference to FIG. 1, in certain embodiments, one or more optional outer strength layers 125 may be formed around the CSM 105 and/or incorporated into an outer wrap of the CSM 105. For example, one or more strength yarns or other strength members may be wrapped or otherwise positioned around the CSM 105. A wide variety of suitable strength yarns may be utilized as desired including, but not limited to, aramid yarns or aramid fibers (e.g., meta-aramid yarns, para-aramid yarns, etc.), Spectra® fiber manufactured and sold by Honeywell International Inc., Technora® fiber manufactured and sold by Teijin Aramid BV, basalt fiber, ultra-high-molecular weight polyethylene ("UHMWPE"), fiberglass yarns, etc. Other suitable strength members may be utilized as desired in other embodiments.

In certain embodiments, such as embodiments in which the CSM 105 includes an outer wrap or embodiments in which the CSM 105 includes a relatively rigid outer layer, an optional coating 130 may be formed on the CSM 105. For example, a polymeric or other coating may be extruded onto or otherwise formed around the CSM 105. Examples of suitable materials that may be utilized to form a coating include, but are not limited to, polyethylene (e.g., medium density polyethylene, etc.), polypropylene, one or more other polymeric materials, one or more thermoplastic materials, one or more elastomeric materials, an ethylene-acrylic acid ("EAA") copolymer, ethyl vinyl acetate ("EVA"), etc.

Regardless of the construction utilized to form a CSM 105, the overall CSM 105 may be formed with any suitable cross-sectional shape and/or dimensions. For example, in certain embodiments, the CSM 105 may have a circular cross-sectional shape. In other embodiments, the CSM 105 may be formed with an elliptical, square, rectangular, hexagonal, octagonal, or any other suitable cross-sectional shape. Additionally, the overall CSM 105 may be formed with any suitable dimensions, such as any suitable diameter and/or cross-sectional area. In certain embodiments, the CSM 105 may have a diameter between approximately 1.2 mm and approximately 8.5 mm. In other embodiments, the CSM 105 may have a diameter of approximately 1.2, 1.5, 2.0, 2.5, 3.0, 3.5, 4.0, 4.5, 5.0, 5.5, 6.0, 6.5, 7.0, 7.5, 8.0, or 8.5 mm, a diameter incorporated into a range between any two of the above values, or a diameter included in a range bounded on either a minimum or maximum end by one of the above values.

As desired, one or more dimensions (e.g., thickness, diameter, etc.) of the CSM 105 and/or various subcomponents of the CSM 105 may be determined based at least in part on the desired overall construction of the hybrid cable 100. For example, one or more dimensions (e.g., overall diameter, layer thickness, layer diameter, etc.) may be optimized in order to provide a desired strength to weight ratio for the hybrid cable 100 based at least in part upon the number of buffer tubes, buffer tube diameters and/or other buffer tube dimensions, number of optical fibers incorporated into the buffer tube, jacket thickness, and/or weight of other cable components. As another example, the dimensions of the CSM 105 and/or various subcomponents of the CSM 105 may be optimized based at least in part upon a desired operating environment for the hybrid cable 100 and/or one or more industry and/or technical standards or specifications.

As a result of incorporating one or more CNTs into the CSM 105, a hybrid cable 100 may be formed with a reduced weight relative to conventional hybrid cables. Conventional hybrid cables typically utilize all metallic conductors to transmit power signals. CNTs may be formed with a reduced weight relative to metallic conductors, thereby reducing the overall weight of the hybrid cable 100 relative to conventional cables. In certain applications, such as aerial applications in which a hybrid cable 100 may be required to support its own weight or load, the reduced weight of the conductive elements may enhance the performance of the hybrid cable 100, allow the hybrid cable 100 to be formed with fewer strength elements (e.g., strength yarns, etc.), and/or allow the hybrid cable 100 to be formed with a smaller overall diameter or size (e.g., as a result of incorporating fewer strength elements, etc.). Additionally, in certain embodiments, CNTs may be more electrically efficient than metallic conductors, thereby enhancing the power transmission properties of a hybrid cable 100 relative to conventional cables, permitting smaller conductive elements to be utilized relative to conventional cables, and/or enhancing diameter and/or weight reductions relative to conventional cables.

With continued reference to FIG. 1, a plurality of buffer tubes 110A-N may be incorporated into the hybrid cable 100. Although six buffer tubes 110A-N are illustrated in FIG. 1, any other suitable number of buffer tubes may be utilized as desired. In certain embodiments, the buffer tubes 110A-N may be stranded or helically twisted around the CSM 105. In other embodiments, the buffer tubes 110A-N may be S-Z stranded around the CSM 105. Each buffer tube (generally referred to as buffer tube 105) may be configured to contain or house one or more optical fibers. Any number of optical fibers, other transmission elements, and/or other components may be positioned within a buffer tube. In certain embodiments, optical fibers may be loosely positioned in a buffer tube 100, wrapped or bundled together, or provided in one or more ribbons or ribbon stacks.

Each buffer tube 110 may be formed with any suitable cross-sectional shapes and/or dimensions. For example, the buffer tube 110 may have a circular cross-sectional shape. As another example, the buffer tube 110 may have an inner diameter that facilitates the housing of a desired number of optical fibers. The buffer tube 105 may also be formed with a wide variety of suitable outside diameters. In certain embodiments, the number of buffer tubes 110A-N utilized and the sizes of the buffer tubes 110A-N may be selected in order to provide a desirable cable geometry. For example, the hybrid cable 100 may be formed with a six around one arrangement with six buffer tubes 110A-N formed around a CSM 105. The buffer tubes 110A-N and the CSM 105 may be sized such that the cable has a desirable overall cross-sectional shape, such as an approximately circular cross-sectional shape. Other numbers, sizes, and/or combinations of buffer tubes and a CSM 105 may be utilized as desired in other embodiments.

A buffer tube 110 may be formed from any suitable materials or combinations of materials. Examples of suitable materials include, but are not limited to, various polymers or polymeric materials, polyethylene ("PE"), high density polyethylene ("HDPE"), polypropylene ("PP"), acrylate or acrylics (e.g., acrylic elastomers, etc.), polyvinyl chloride ("PVC"), polyurethane, a fluoropolymer, neoprene, polyvinylidene fluoride ("PVDF"), polybutylene terephthalate ("PBT"), ethylene, plastic, or other appropriate materials or combinations of suitable materials. Additionally, a buffer tube 110 may be formed as either a single layer or a multiple layer buffer tube. In the event that multiple layers are utilized, the layers may all be formed from the same material(s) or, alternatively, at least two layers may be formed from different materials or combinations of materials. For example, at least two layers may be formed from different polymeric resins.

Any number of optical fibers may be housed within a buffer tube 110 as desired in various embodiments. Each optical fiber may be a single mode fiber, multi-mode fiber, pure-mode fiber, polarization-maintaining fiber, multi-core fiber, or some other optical waveguide that carries data optically. Additionally, each optical fiber may be configured to carry data at any desired wavelength (e.g., 1310 nm, 1550 nm, etc.) or combination of wavelengths and/or at any desired transmission rate or data rate. The optical fibers may also include any suitable composition and/or may be formed from a wide variety of suitable materials capable of forming an optical transmission media, such as glass, a glassy substance, a silica material, a plastic material, or any other suitable material or combination of materials. Each optical fiber may also have any suitable cross-sectional diameter or thickness. In certain embodiments, an optical fiber may include a core that is surrounded by a cladding. Additionally, one or more suitable coatings may surround the cladding.

In certain embodiments, a plurality of optical fibers may be loosely positioned within a buffer tube 110. In other embodiments, a plurality of optical fibers may be arranged into one or more suitable bundles or groupings. As desired, each group of fibers may include one or more suitable wraps or binders that maintain the fibers in a group. For example, a wrap or binder may be helically wrapped around the fibers in a group. Examples of suitable binders include, but are not limited to, identification threads (e.g., a colored thread that facilitates identification of a group of optical fibers, etc.), water-blocking threads, strength yarns, etc. In yet other embodiments, a plurality of optical fibers may be arranged into one or more fiber ribbons and/or into a ribbon stack. For example, optical fibers may be formed or incorporated into a plurality of different ribbon arrangements that are stacked on top of one another to form a ribbon stack. As another example, optical fibers may be formed into one or more ribbon arrangements that are folded or otherwise manipulated into a stacked or other configuration. As yet another example, optical fibers may be arranged in one or more ribbons that each include intermittent, spaced, or spiderweb-type bonding that permits the ribbons to be bundled, rolled, and/or otherwise formed into a desired arrangement.

In certain embodiments, a suitable filling compound may be utilize to fill the buffer tube 110. In other words, a filling compound may be utilized to fill the interstitial spaces within the buffer tube 110 that are not occupied by optical fibers (or other components). A wide variety of filling compounds may be utilized as desired. For example, water-blocking gels, grease, foam materials, etc. may be utilized as desired. In other embodiments, the hybrid cable 100 may be formed as a "dry" cable that does not include filling compound. As desired, water-blocking tapes, water-blocking wraps, water-blocking yarns, strength yarns (e.g., aramid yarns), water-blocking powders, moisture absorbing materials, dry inserts, and/or a wide variety of other suitable materials may be incorporated into the buffer tube 110. In certain embodiments, a "dry" cable component may be formed as a relatively continuous layer that is incorporated into the buffer tube 110. For example, a "dry" cable component may be wrapped around, enclose, or entrap certain optical fibers. In other embodiments, a "dry" cable component may include a plurality of discrete components that are intermittently wrapped, partially wrapped, or otherwise positioned within the buffer tube 110 at any number of desired locations (e.g., a plurality of spaced locations, in a relatively continuous manner, etc.) along a longitudinal length of the hybrid cable 100.

Additionally, in certain embodiments, one or more dielectric spacers, fillers, or other components may be utilized in place of one or more of the buffer tube 110A-N. Alternatively, one or more empty buffer tubes may be utilized. Spacers, fillers, and/or empty buffer tubes may be utilized to provide the hybrid cable 100 with a desired overall cross-sectional shape. As one example, a hybrid cable 100 may be designed to house a number of optical fibers that may be placed into five buffer tubes. A dielectric filler may be substituted for a sixth buffer tube in order to provide the hybrid cable 100 with a desired six around one design or geometry (e.g., six elements around the CSM 105).

With continued reference to FIG. 1, an outer jacket 115 may be formed around the CSM 105 and the buffer tubes 110A-N. The jacket 115 may define an outer periphery of the hybrid cable 100. The jacket 115 may enclose the internal components of the hybrid cable 100, seal the cable 100 from the environment, and provide some strength and structural support. The jacket 115 may be formed from a wide variety of suitable materials, such as a polymeric material, polyvinyl chloride ("PVC"), polyurethane, one or more polymers, a fluoropolymer, polyethylene, medium density polyethylene ("MDPE"), neoprene, chlorosulfonated polyethylene, polyvinylidene fluoride ("PVDF"), polypropylene, modified ethylene-chlorotrifluoroethylene, fluorinated ethylene propylene ("FEP"), ultraviolet resistant PVC, flame retardant PVC, low temperature oil resistant PVC, polyolefin, flame retardant polyurethane, flexible PVC, low smoke zero halogen ("LSZH") material, plastic, rubber, acrylic, or some other appropriate material known in the art, or a combination of suitable materials. As desired, the jacket 115 may also include flame retardant materials, smoke suppressant materials, carbon black or other suitable material for protection against exposure to ultraviolet ("UV") light, and/or other suitable additives. The jacket 115 may include a single layer or, alternatively, multiple layers of material (i.e., multiple layers of the same material, multiple layers of different materials, etc.). As desired, the jacket 115 may be characterized as an outer sheath, a casing, a circumferential cover, or a shell.

The jacket 115 may enclose one or more openings in which other components of the hybrid cable 100, such as the CSM 105 and the buffer tubes 110A-N, are disposed. At least one opening enclosed by the jacket 115 may be referred to as a cable core, and any number of suitable cable components may be disposed in a cable core. A wide variety of other components may be situated within a cable core as desired, such as other transmission media, a power conductor, etc. Indeed, a wide variety of different cable constructions may be utilized in accordance with various embodiments of the disclosure.

The jacket 115 may be formed with a wide variety of suitable cross-sectional shapes and/or other dimensions. For example, as shown in FIG. 1, the jacket 115 may be formed with a circular or round cross-sectional shape. In other embodiments, the jacket 115 may be formed with an elliptical or other suitable cross-sectional shape. Additionally, the jacket 115 may be formed with a wide variety of suitable dimensions, such as any suitable inner diameter (i.e., a diameter defining a core size of the hybrid cable 100) and/or outer diameter (i.e., a diameter defining the overall size of the hybrid cable 100).

In certain embodiments, one or more outer wraps 120, layers, or other cable components may be positioned between the plurality of buffer tubes 110A-N and the jacket 115. A wide variety of suitable outer wraps 120 may be utilized as desired in different embodiments. In one example embodiment, one or more binders may be wrapped around the buffer tubes 110A-N in order to hold the buffer tubes 110A-N in place. For example, one or more binders may be helically wrapped around the buffer tubes 110A-N. As another example, a plurality of binders may be wrapped around the buffer tubes 110A-N at a respective plurality of longitudinally spaced locations, such as at S-Z stranding switchbacks. A binder may be formed from a wide variety of suitable materials, such as suitable threads, polymeric tapes, or other materials. Additionally, a binder may have a wide variety of suitable dimensions, such as any suitable diameter, cross-sectional area, or width (e.g., a width of a binder tape, etc.).

As another example of an outer wrap 120, an inner jacket may be formed around the plurality of buffer tubes 110A-N in order to maintain the positions of the buffer tubes 11A-N. As desired, one or more additional layers may be positioned between the inner jacket and the outer jacket 115, such as a water-blocking layer and/or a strength layer. An inner jacket may be formed from a wide variety of suitable materials, such as any of the materials discussed above for the outer jacket 115. Additionally, an inner jacket may be formed with any suitable thickness and/or other dimensions.

As another example of an outer wrap 120, one or more water-blocking layers may be positioned outside of the buffer tubes 110A-N. For example, one or more water-blocking threads may be helically wrapped around the buffer tubes 110A-N or positioned adjacent to the buffer tubes 110A-N within the hybrid cable 100. As another example, a water-blocking tape may be wrapped around the buffer tubes 110A-N. Indeed, a water-blocking component may be formed with a wide variety of suitable constructions (e.g., yarns, tapes, etc.). Additionally, a water-blocking component may include any number of suitable water-blocking materials, such as super absorbent polymers ("SAP") and/or other suitable materials. Additionally, in certain embodiments, a water-blocking component may be formed as a relatively continuous layer that is incorporated into the hybrid cable 100. For example, a water-blocking component may be a continuous component that is wrapped around or positioned adjacent to the buffer tubes 110A-N. In other embodiments, a water-blocking component may include a plurality of discrete components that are intermittently wrapped, partially wrapped, or otherwise positioned about the buffer tubes 110A-N at any number of desired locations (e.g., a plurality of spaced locations, in a relatively continuous manner, etc.) along a longitudinal length of the hybrid cable 100.

As yet another example of an outer wrap 120, in certain embodiments, a strength layer may be formed around the plurality of buffer tubes 110A-N. For example, a layer of strength yarns, such as aramid yarns or any of the other strength yarns discussed above with reference to the CSM 105 may be wrapped or otherwise formed around the plurality of buffer tubes 110A-N. The strength layer may be formed with any suitable dimensions, such as any suitable thickness. In the event that strength yarns are used, any number of strength yarns may be incorporated into the strength layer, and the strength yarns may have any suitable diameter and/or other dimensions.

The hybrid cable 100 illustrated in FIG. 1 is provided by way of example only. A wide variety of other components may be incorporated into a hybrid cable as desired in other embodiments. For example, a hybrid cable may include a wide variety of suitable CNT constructions, transmission media, a wide variety of different types of tubes, water-blocking materials, water-swellable materials, insulating materials, dielectric materials, gels, fillers, and/or other materials. Additionally, a cable may be designed to satisfy any number of applicable cable standards.

Conditional language, such as, among others, "can," "could," "might," or "may," unless specifically stated otherwise, or otherwise understood within the context as used, is generally intended to convey that certain embodiments could include, while other embodiments do not include, certain features, elements, and/or operations. Thus, such conditional language is not generally intended to imply that features, elements, and/or operations are in any way required for one or more embodiments or that one or more embodiments necessarily include logic for deciding, with or without user input or prompting, whether these features, elements, and/or operations are included or are to be performed in any particular embodiment.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

Although specific embodiments have been described above in detail, the description is merely for purposes of illustration. It should be appreciated, therefore, that many aspects described above are not intended as required or essential elements unless explicitly stated otherwise. Various modifications of, and equivalent acts corresponding to, the disclosed aspects of the exemplary embodiments, in addition to those described above, can be made by a person of ordinary skill in the art, having the benefit of the present disclosure, without departing from the spirit and scope of the invention defined in the following claims, the scope of which is to be accorded the broadest interpretation so as to encompass such modifications and equivalent structures.

That which is claimed:

1. A cable, comprising:
    a longitudinally extending central strength member comprising a plurality of individually insulated components that are helically twisted together and that each comprise at least one respective carbon nanotube capable of transmitting a power signal of at least 12 volts, the plurality of individually insulated components comprising:
        a first component having one or more first carbon nanotubes formed into a first solid conductor having a circular cross-sectional shape and configured to transmit a downstream power signal; and
        a second component having one or more second carbon nanotubes formed into a second solid conductor having a circular cross-sectional shape and configured to transmit a return power signal;
    a plurality of buffer tubes positioned around the central strength member, each of the plurality of buffer tubes housing at least one optical fiber; and
    an outer jacket surrounding the plurality of buffer tubes and the central strength member.

2. The cable of claim 1, wherein the at least one carbon nanotube included in one of the plurality of individually insulated components comprises a plurality of carbon nanotubes bonded together with an epoxy resin.

3. The cable of claim 1, wherein the at least one carbon nanotube included in one of the plurality of individually insulated components comprises a plurality of carbon nanotubes that are stranded together.

4. The cable of claim 1, wherein the central strength member further comprises at least one metallic conductor helically twisted with the plurality of individually insulated components.

5. The cable of claim 1, wherein the central strength member further comprises at least one dielectric strength member helically twisted with the plurality of individually insulated components.

6. The cable of claim 1, wherein the central strength member has an outer diameter of at least approximately 1.2 mm.

7. The cable of claim 1, wherein the central strength member further comprises:
a longitudinally extending wrap formed around the plurality of individually insulated components.

8. A cable, comprising:
a longitudinally extending central strength member comprising a plurality individually insulated components that are helically twisted together, each of the plurality of individually insulated components comprising one or more respective carbon nanotubes formed into a solid conductive component having a circular cross-sectional area and capable of transmitting a power signal;
a plurality of buffer tubes positioned around the central strength member, each of the plurality of buffer tubes housing at least one optical fiber; and
an outer jacket surrounding the plurality of buffer tubes and the central strength member.

9. The cable of claim 8, wherein each of the plurality of individually insulated components is capable of transmitting a power signal of at least 12 volts.

10. The cable of claim 8, wherein the one or more carbon nanotubes included in one of the plurality of individually insulated components comprises a plurality of carbon nanotubes bonded together with an epoxy resin.

11. The cable of claim 8, wherein the one or more carbon nanotubes included in one of the plurality of individually insulated components comprises a plurality of carbon nanotubes that are stranded together.

12. The cable of claim 8, wherein the central strength member further comprises at least one metallic conductor helically twisted with the plurality of individually insulated components.

13. The cable of claim 8, wherein the central strength member further comprises at least one dielectric strength member helically twisted with the plurality of individually insulated components.

14. The cable of claim 8, wherein the central strength member further comprises:
a longitudinally extending wrap formed around the plurality of individually insulated components.

15. A cable, comprising:
a longitudinally extending central strength member comprising a plurality of individually insulated components that are helically twisted together, each of the plurality of individually insulated components comprising one or more carbon nanotubes capable of transmitting a power signal, wherein the plurality of individually insulated components comprises:
a first component configured to transmit a downstream power signal; and
a second component configured to transmit a return power signal;
a plurality of buffer tubes positioned around the central strength member, each of the plurality of buffer tubes housing at least one optical fiber; and
an outer jacket surrounding the plurality of buffer tubes and the central strength member.

16. The cable of claim 15, wherein each of the plurality of individually insulated components is capable of transmitting a power signal of at least 12 volts.

* * * * *